United States Patent
Yokoyama

[11] Patent Number: 6,086,292
[45] Date of Patent: Jul. 11, 2000

[54] ADAPTER FOR CONNECTING A DRILL WITH A SOURCE OF VACUUM

[75] Inventor: Yosihiro Yokoyama, Gunma-ken, Japan

[73] Assignee: Unika Co., Ltd., Tokyo, Japan

[21] Appl. No.: 09/200,857

[22] Filed: Nov. 27, 1998

[30] Foreign Application Priority Data

Nov. 28, 1997 [JP] Japan ..................... 9-328257

[51] Int. Cl.[7] .................................................. B23B 47/00
[52] U.S. Cl. .............................. 408/67; 279/20; 279/143; 408/56; 408/58
[58] Field of Search ..................... 279/20, 143; 408/56, 408/57, 58, 67

[56] References Cited

U.S. PATENT DOCUMENTS

| 2,339,324 | 1/1944 | Fischer | 408/58 |
| 4,643,621 | 2/1987 | Fuller, Jr. et al. | 408/57 |
| 4,743,145 | 5/1988 | Hendricks et al. | 279/20 |
| 4,752,161 | 6/1988 | Hill | 408/67 |
| 5,544,986 | 8/1996 | Kudo et al. | 408/67 |

FOREIGN PATENT DOCUMENTS

| 3605204 | 8/1987 | Germany | 408/58 |
| 2096029 | 10/1982 | United Kingdom | 408/58 |
| 2096030 | 10/1982 | United Kingdom | 408/58 |

*Primary Examiner*—Andrea L. Pitts
*Assistant Examiner*—Monica Smith
*Attorney, Agent, or Firm*—Wenderoth, Lind & Ponack, L.L.P.

[57] ABSTRACT

A drilling apparatus capable of removing drill chips from a workpiece under vacuum. The drilling apparatus includes an elongated drill having a body and a shank. The body has an axial through hole to receive drill chips. The shank has a plurality of radial holes communicated with the axial holes of the body. A vacuum adapter is hermetically placed around the shank and includes a cylindrical hollow body. The hollow body of the adapter includes a radial through port. The radial through port has one end communicated with the radial holes and the other end communicated with an external source of vacuum through a vacuum hose. A cylindrical extension unitarily extends from one end of the hollow body of the adapter and includes an annular projection. The shank has a corresponding annular groove to lockingly receive the annular projection in order to lock the adapter against axial displacement relative to the drill.

22 Claims, 5 Drawing Sheets

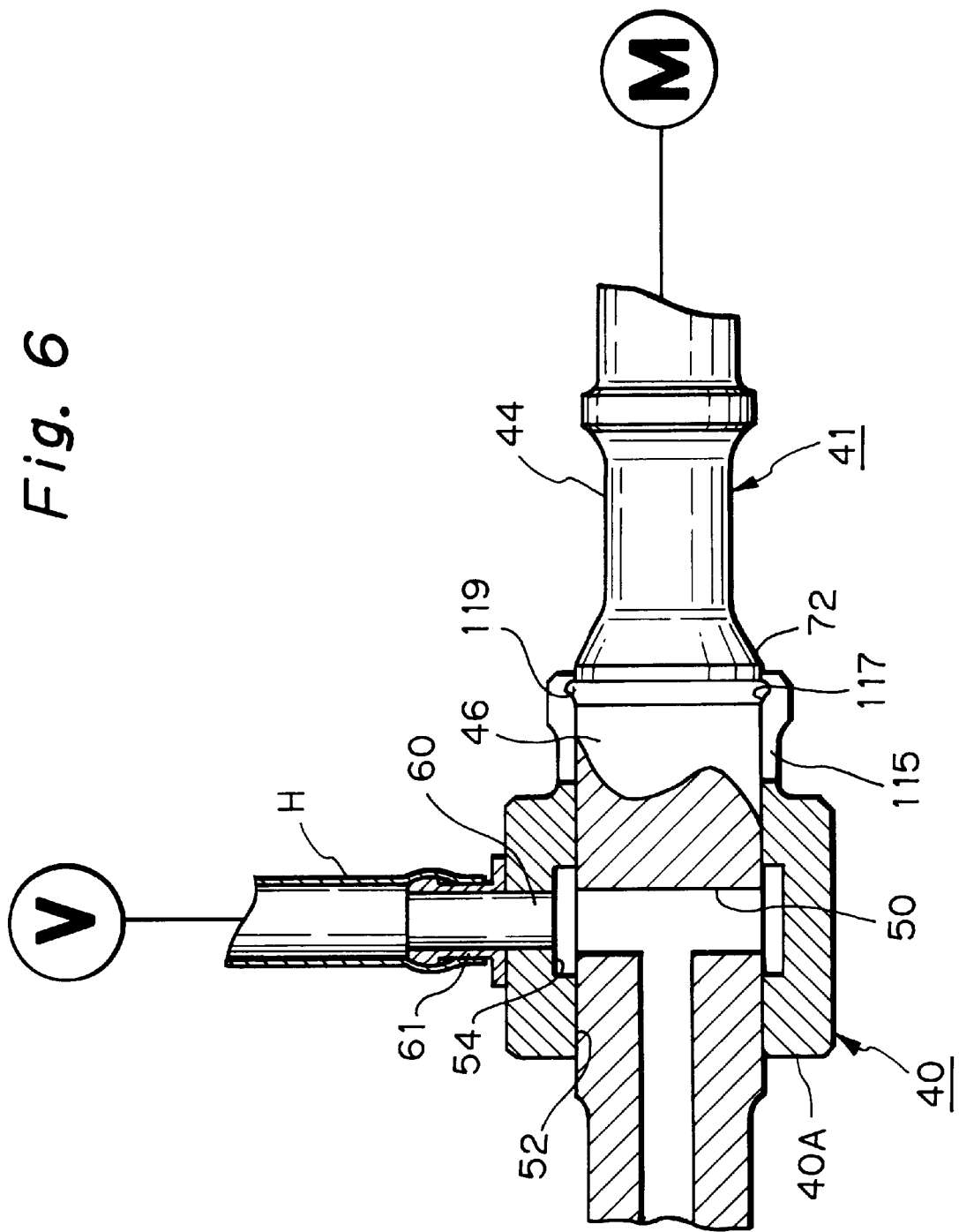

ADAPTER FOR CONNECTING A DRILL WITH A SOURCE OF VACUUM

BACKGROUND OF THE INVENTION

The present invention relates to a drilling machine operatively associated with a vacuum system so as to remove drill chips from a workpiece through an axial drill hole and more particularly, to an adapter fitted around the shank of a drill and designed to connect the drill with an external source of vacuum.

For the purpose of describing a known adapter, reference will first be made to FIG. 1.

As shown, in FIG. 1 a cylindrical adapter 10 is fitted around a drill 11. The drill 11 is composed of a shank 12 connected to a motor (not shown) and having a blind bore 14, and a body 16 rigidly received in the bore 14. The adapter 10 is rotatable relative to the shank 12. The body 16 has an axial through hole 18. The shank 12 has a plurality of radial holes 20 communicated with the axial through hole 18. An annular groove 22 is formed in the inner surface of the adapter 10 and communicates with the radial holes 20. The adapter 10 also includes a radial port 24 communicated with the annular groove 22. A fitting 26 is mounted on the outer periphery of the adapter 10. The fitting 26 has one end communicated with the port 24 and the other end connected to a vacuum hose H. Two annular grooves 28 are formed in one end of the shank 12 to receive two respective locking rings 30. The locking rings 30 are located at opposite ends of the adapter 10 so as to inhibit axial displacement of the adapter 10 along the shank 12. During a drilling operation, the shank 12 and the body 16 are driven for rotation by the motor whereas the adapter 10 is held against rotation.

To separate the body 16 from the shank 12, a cotter pin must be inserted into one of the radial holes 20 from the outside of the drill. To that end, the two locking rings 30 must first be removed from the shank 12 to allow separation of the adapter 10 from the shank 12. This removal requires a special tool and is cumbersome.

Accordingly, it is an object of the present invention to provide an adapter for connecting a drill with an external source of vacuum, which can readily be removed from the drill without the need for a special tool.

SUMMARY OF THE INVENTION

According to one aspect of the present invention, there is provided a vacuum adapter for connecting a drill with an external source of vacuum. The drill includes a body, and a shank having one end connected to the proximal end of the body and the other end adapted to be connected to a drive mechanism. The body includes an axial hole extending from the distal end to one end of said shank which is remote from the drive mechanism. The shank includes at least one radial hole communicated with the axial hole. The vacuum adapter is relatively rotatably mounted on the outer peripheral surface of the shank. The vacuum adapter comprises a generally cylindrical hollow body adapted to be fitted around the outer peripheral surface of the shank and including a radial through port having one end adapted to be fluidly communicated with the radial hole of the shank and the other end adapted to be fluidly communicated with an external source of vacuum through a vacuum hose.

As a feature of the present invention, the hollow body has an engagement portion. The shank has a corresponding engagement portion in its outer peripheral surface. The engagement portion of the hollow body is lockingly engaged with the engagement portion of the shank so as to prevent axial displacement of the vacuum adapter relative to the drill. The engagement portion of the hollow body is capable of radial displacement and is movable between an engaged position where the engagement portions are lockingly engaged with each other and a disengaged position where the engagement portion of the hollow body is disengaged from the engagement portion of the shank to permit removal of the vacuum adapter from the drill.

Preferably, the engagement portion of the shank may have a slanted surface. By this arrangement, the engagement portion of the hollow body is subjected to a radial outward force when a predetermined axial force is applied to the vacuum adapter in such a manner that the engagement portion of the hollow body is urged against the slanted surface of the engagement portion of the shank.

In a preferred embodiment, the engagement portion of the hollow body is in the form of an annular projection, and the engagement portion of the shank is in the form of a corresponding annular recess. Alternatively, the engagement portion of the hollow body may be in the form of an annular recess, and the engagement portion of the shank may be in the form of a corresponding annular projection. Also, the engagement portion of the hollow body may include a plurality of axial slits so as to promote radial enlargement of the engagement portion of the hollow body.

The hollow body may preferably have an annular groove communicated with the radial hole of the shank and fluidly communicated with the radial through port. This arrangement facilitates removal of drill chips from the drill. The hollow body is preferably made of a plastic material which has a self-lubricating property and is elastic.

In a preferred embodiment, a retaining member is engaged around the engagement portion of the hollow body to hold the same in its engaged position, and the retaining member is disengaged from the engagement portion of the hollow body so as to move the same from the engaged position to the disengaged position. The retaining member may be capable of axial displacement on the hollow body and engaged with the engagement portion of the hollow body so as to prevent radial outward displacement of the engagement portion of the hollow body. The retaining member may have an internally threaded inner surface, whereas the engagement portion of the hollow body may have an externally threaded outer surface. The internally threaded inner surface of the retaining member may be threadably engaged with the externally threaded surface of the engagement portion of the hollow body so as to hold the engagement portion of the hollow body in its engaged position.

In a preferred embodiment, a retaining member is capable of rotation about the axis of the hollow body. The retaining member is rotated to thereby cause the engagement portion of the hollow body to be moved between the engaged position and the disengaged position.

In an alternative embodiment, the hollow body includes an end flange. An annular retaining member is forced against the end flange of the hollow body under the action of a compression spring so as to hold the engagement portion of the hollow body in its engaged position. Alternatively, the retaining member may be rotatably mounted around the engagement portion of the hollow body and may include at least one relatively small opening and at least one relatively large opening. A ball may be selectively engaged with the small opening and the large opening.

According to another aspect of the present invention, there is provided a drilling apparatus comprising an elongated drill including a drill body having a proximal end and a distal end, and a shank having one end connected to the proximal end of the drill body and the other end adapted for connection to a drive mechanism. The drill body including an axial through hole extending from the distal end to the proximal end of the shank. The shank includes a plurality of radial holes communicated with the through hole of the drill body and having an outer peripheral surface. Also, a vacuum adapter, including a substantially cylindrical hollow body, is hermetically placed around the proximal end of the shank. The hollow body includes a radial through port having one end communicated with the radial holes of the shank and the other end adapted for fluid communication with an external source of vacuum. The drill is being rotated relative to the vacuum adapter by the drive mechanism. As a feature, the hollow body has an engagement portion, and the shank has a corresponding engagement portion. The engagement portion of the hollow body is engaged with the engagement portion of the shank so as to prevent axial displacement of the vacuum adapter relative to the drill. The engagement portion of the hollow body is capable of radial displacement and is movable between an engaged position, where the engagement portions are lockingly engaged with each other, and a disengaged position where the engagement portion of the hollow body is disengaged from the engagement portion of the shank to permit removal of the vacuum adapter from the drill.

These and other features and advantages of the present invention will become apparent from the following detailed description of the invention when taken in conjunction with the accompanying drawings wherein like reference numerals designate like or corresponding elements throughout the several views.

BRIEF DESCRIPTION OF THE DRAWINGS

FIG. 6 is a view similar to FIG. 2, but shows an alternative embodiment of the present invention.

DESCRIPTION OF THE PREFERRED EMBODIMENTS

Figure 2:
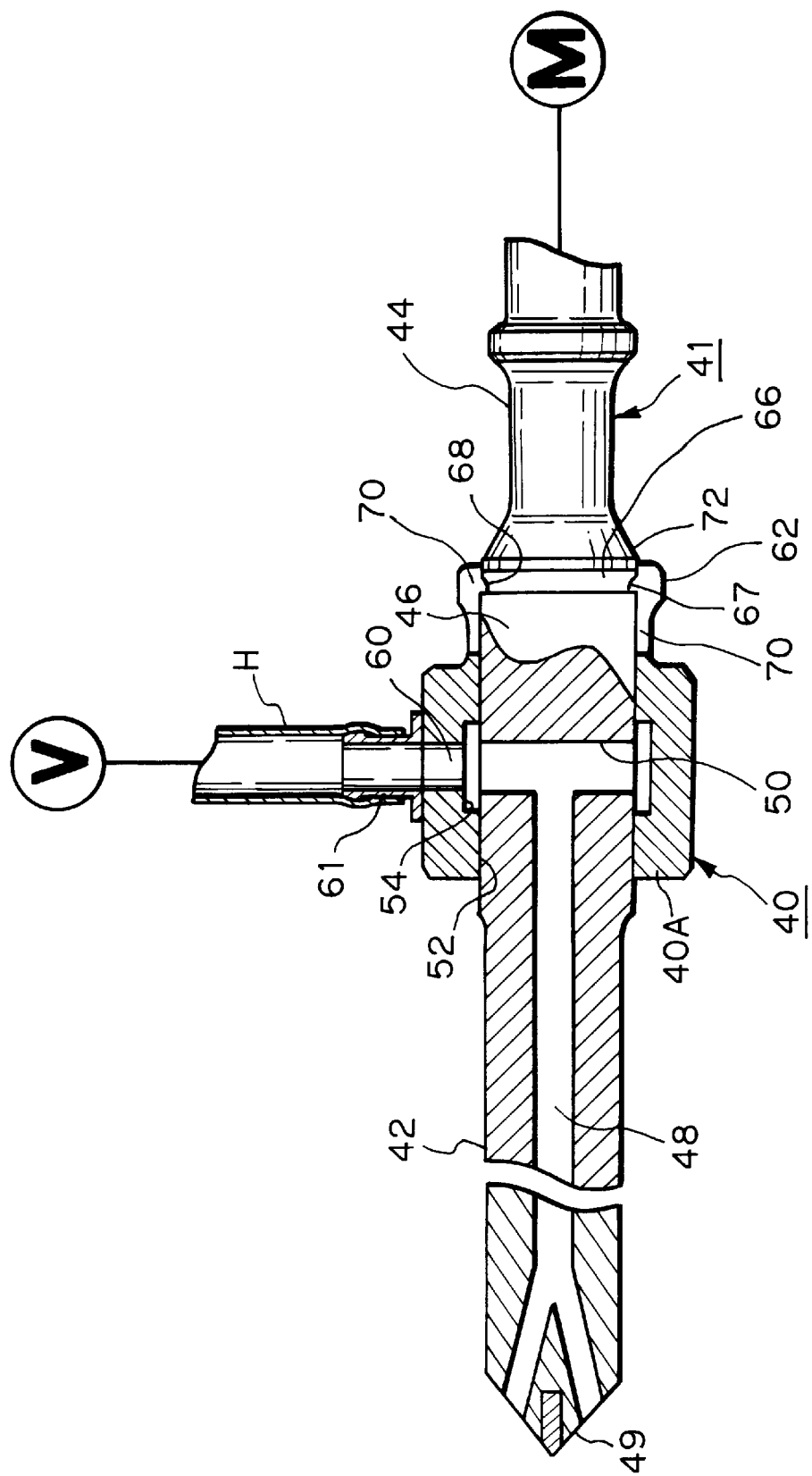
FIG. 2 is a sectional view of a vacuum adapter fitted around a one-piece drill and constructed in accordance with an embodiment of the present invention.

Referring first to FIG. 2, there is illustrated a vacuum adapter 40 according to one embodiment of the present invention. In the illustrated embodiment, an elongated drill 41 has a generally cylindrical shape. The drill 41 is of a one-piece structure and generally includes a body 42 and a shank 44. One end of the shank 44 is adapted to be connected to a motor M as a drive means. The other end of the shank 44, as designated at 46, has an enlarged circular section. The body 42 has an axial hole 48 extending from a distal end or tip 49 to the enlarged end 46 of the shank 44. The enlarged end 46 has a plurality of radial holes 50 connected to and extending radially from one end of the axial hole 48.

Preferably, the vacuum adapter 40 is formed of a suitable plastic material which has resistance to wear and exhibits a self-lubricating property, i.e., has a low frictional resistance. The adapter 40 is hollow and includes a generally cylindrical hollow body 40A hermetically fitted around the enlarged end 46 of the shank 44 of the drill 41. An annular groove 54 is formed in an inner surface 52 of the adapter body 40A and is communicated with the radial holes 50. The adapter body 40A also includes a radial through port 60. The radial through port 60 has one end communicated with the annular groove 54 and the other end connected to a vacuum hose H through a fitting 61. An external source of vacuum V is connected to the hose H and draws a vacuum to the tip 49 of the drill 42 through the hose H, the radial through port 60, the radial holes 50, and the axial hole 48 so as to remove drill chips from a workpiece (not shown).

As a feature of the present invention, a generally cylindrical extension 62 unitarily extends from one end of the adapter body 40A. The enlarged end 46 of the shank 44 has an annular groove 66 adjacent to one end thereof. The groove 66 has a tapered or slanted surface 67. A corresponding annular projection 68 extends from the inner surface of the cylindrical extension 62 and is lockingly engaged with annular groove 66. This engagement prevents axial displacement of the adapter 40 on and along the shank 44. Preferably, a plurality of axial slits 70 are formed in the cylindrical extension 62 at given intervals to thereby promote elastic deformation of the cylindrical extension 62 in the radial direction of the drill.

The cylindrical extension 62 takes two different positions. In a first, engaged position, the projection 68 is tightly engaged with the groove 66. Upon application of a predetermined axial force to the adapter 40 in a rightward direction, as viewed in FIG. 2, a radial outward force is generated due to the slanted surface 67 of the groove 66. This force enables the cylindrical extension 62 to be radially outwardly deformed into a second, disengaged position. When deformed, the projection 68 is disengaged from the groove 66.

To mount the adapter 40 on the drill 41, the adapter 40 is first placed around the end of the shank 44 which is remote from the drill body 42 and then, the adapter is moved toward the enlarged end 46 of the shank 44. The cylindrical extension 62 is radially enlarged when the projection 68 is brought into contact with a tapered section 72 provided at the right end, as viewed in FIG. 2, of the enlarged end 46 of the shank 44. Finally, the projection 68 is received in the groove 66 to lock the adapter 40 against axial movement relative to the shank 44.

The drill 41 is driven by the motor M and rotated relative to the adapter 40. Although an axial force is exerted on the adapter 40 during a normal drilling operation, engagement of the projection 68 with the groove 66 prevents displacement of the adapter 40 relative to the drill 41.

Figure 3:
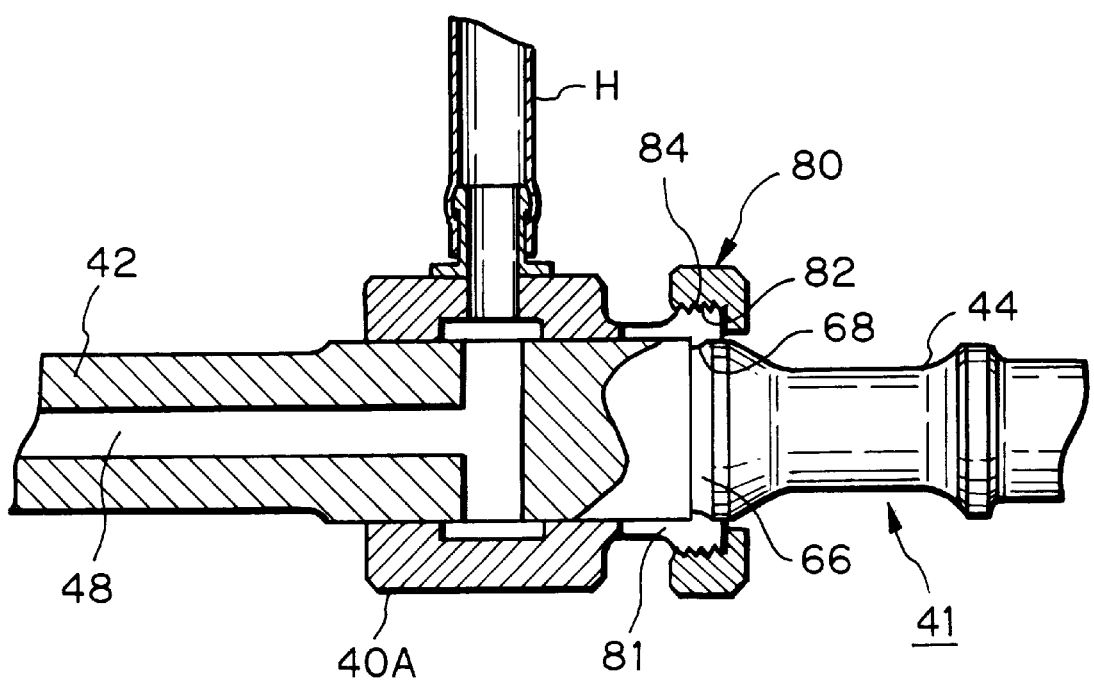
FIG. 3 is a view similar to that of FIG. 2, but shows a vacuum adapter constructed in accordance with embodiment of the present invention.
Figure 4:
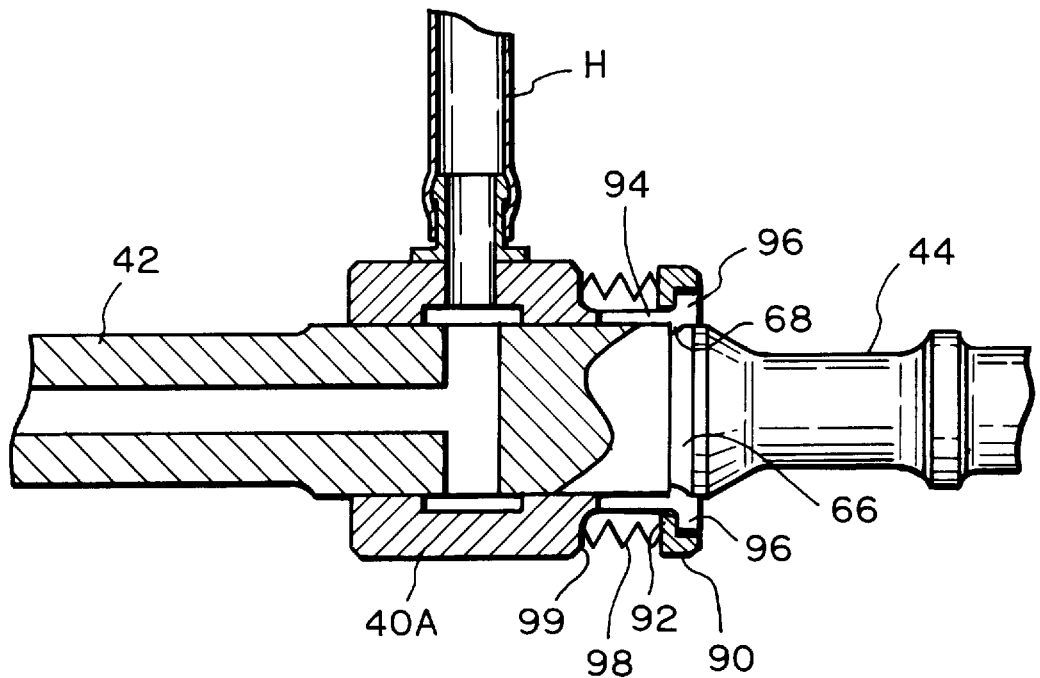
FIG. 4 is a view similar to that of FIG. 2, but shows a vacuum adapter constructed in accordance with a further embodiment of the present invention.

An undue axial force, if generated, may cause the projection 68 to disengage from the groove 66. To that end, retaining means may be employed as shown in FIGS. 3 and 4. Referring specifically to FIG. 3, a retainer ring or nut 80 has an internally threaded inner surface 82. A cylindrical extension 81 is substantially similar to the cylindrical extension 62, but has an externally threaded end 84. The retainer ring 80 is threaded on the externally threaded end 84 of the extension 81 so as to hold the cylindrical extension 81 against radial enlargement and thus, ensure tight engagement of the projection 68 with the groove 66. To remove the adapter, the retainer ring 80 is rotated about the axis of the drill and disengaged from the cylindrical extension 81. The adapter is then axially moved in a rightward direction, as viewed in FIG. 3, away from the drill body 42.

In the embodiment shown in FIG. 4, a retainer ring 90 has an annular flange 92. A cylindrical extension 94 has an end flange 96 on its outer periphery. The flange 92 matingly abuts against the end flange 96. A coiled compression spring 98 is disposed around the cylindrical extension 94 and extends between the flange 92 and a shoulder 99 of the adapter body 40A. The compression spring 98 urges the flange 92 of the retainer ring 90 against the end flange 96 of the cylindrical extension 94 to ensure engagement of the projection 68 with the groove 66. To remove the adapter, the retainer ring 90 is first pressed toward the shoulder 99 so as to compress the compression spring 98 whereby the retainer ring 90 is disengaged from the cylindrical extension 94 to permit radial enlargement of the cylindrical extension 94. An axial force is then applied to the adapter in a rightward direction toward the motor M so that the projection 68 is disengaged from the groove 66. Finally, the adapter 40 is removed from the enlarged end of the shank 44.

Figure 5:
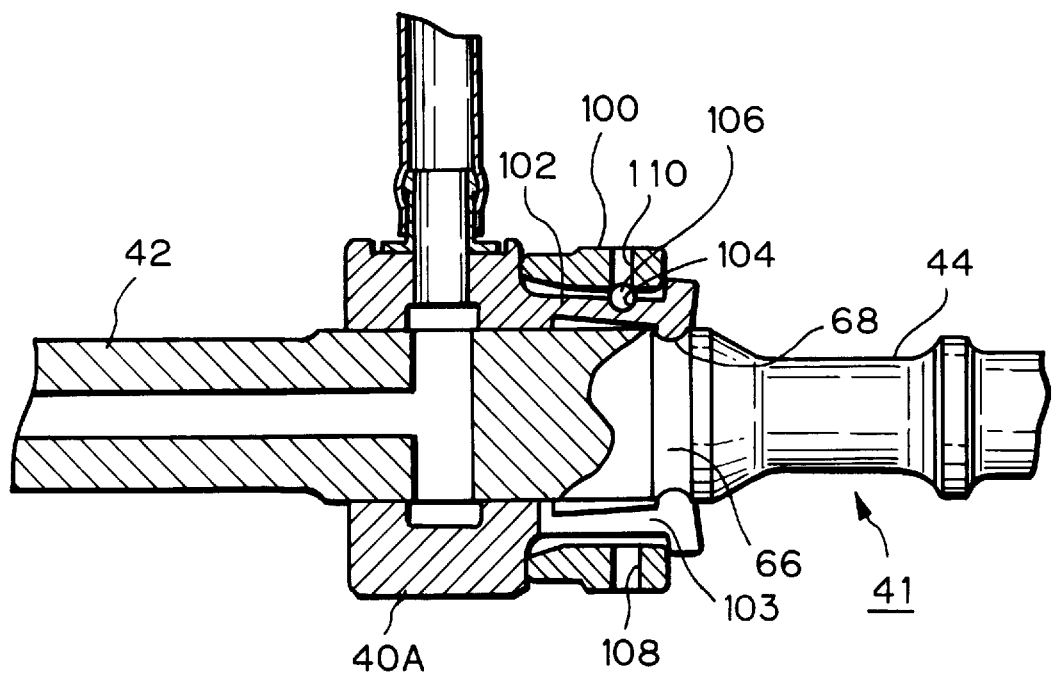
FIG. 5 is a view similar to that of FIG. 2, but shows a vacuum adapter constructed in accordance with a further embodiment of the present invention.

FIG. 5 shows a modified form of the retaining means. Specifically, a retainer ring 100 is placed around a cylindrical extension 102 of the adapter. The retainer ring 100 is angularly moved to permit radial enlargement of the cylindrical extension 102. As in the embodiments shown in FIGS. 2 to 4, a plurality of axial slits 103 are formed in the cylindrical extension 102 at given intervals. Also, a recess 104 is formed in the cylindrical extension 102 to receive a ball 106. A plurality of large openings 108 and a plurality of small openings 110 are alternately formed in the inner periphery of the retainer ring 100 to selectively receive the ball 106. In FIG. 5, the ball 106 is received in one of the small openings 110. In this state, the retainer ring 100 urges the cylindrical extension 102 against the shank 44 through the ball 106 so as to inhibit radial enlargement of the cylindrical extension 102. When the retainer ring 100 is rotated to cause the ball 106 to be received in one of the large openings 108, a force applied to the cylindrical extension 102 through the ball 106 decreases. This permits enlargement of the cylindrical extension 102 and thus, removal of the adapter from the drill 41.

In lieu of the large openings 108 and the small openings 110, shallow and deep recesses (not shown) may be formed in the rotary retainer ring 100. Still alternatively, a cam mechanism (not shown) may be arranged in the cylindrical extension and the ring to cause the rotary retainer ring to urge the cylindrical extension against the drill.

In the embodiments shown in FIGS. 3 to 5, the locking projection is normally (i.e., when no external force is applied) fitted in the groove 66. Although not shown, the projection may alternatively be separated from the groove 66 in a normal state and then, engaged with the groove 66 when the retainer ring is fitted around the cylindrical extension.

In the foregoing embodiments, the cylindrical extension has a projection, and the shank has a corresponding groove. However, the invention is not limited thereto. For example, as shown in FIG. 6, the adapter body 40A includes a cylindrical extension 115 which is provided with an annular groove 117. The shank 44 is provided with an annular projection 119 which is to be received in the groove 117.

Figure 1:
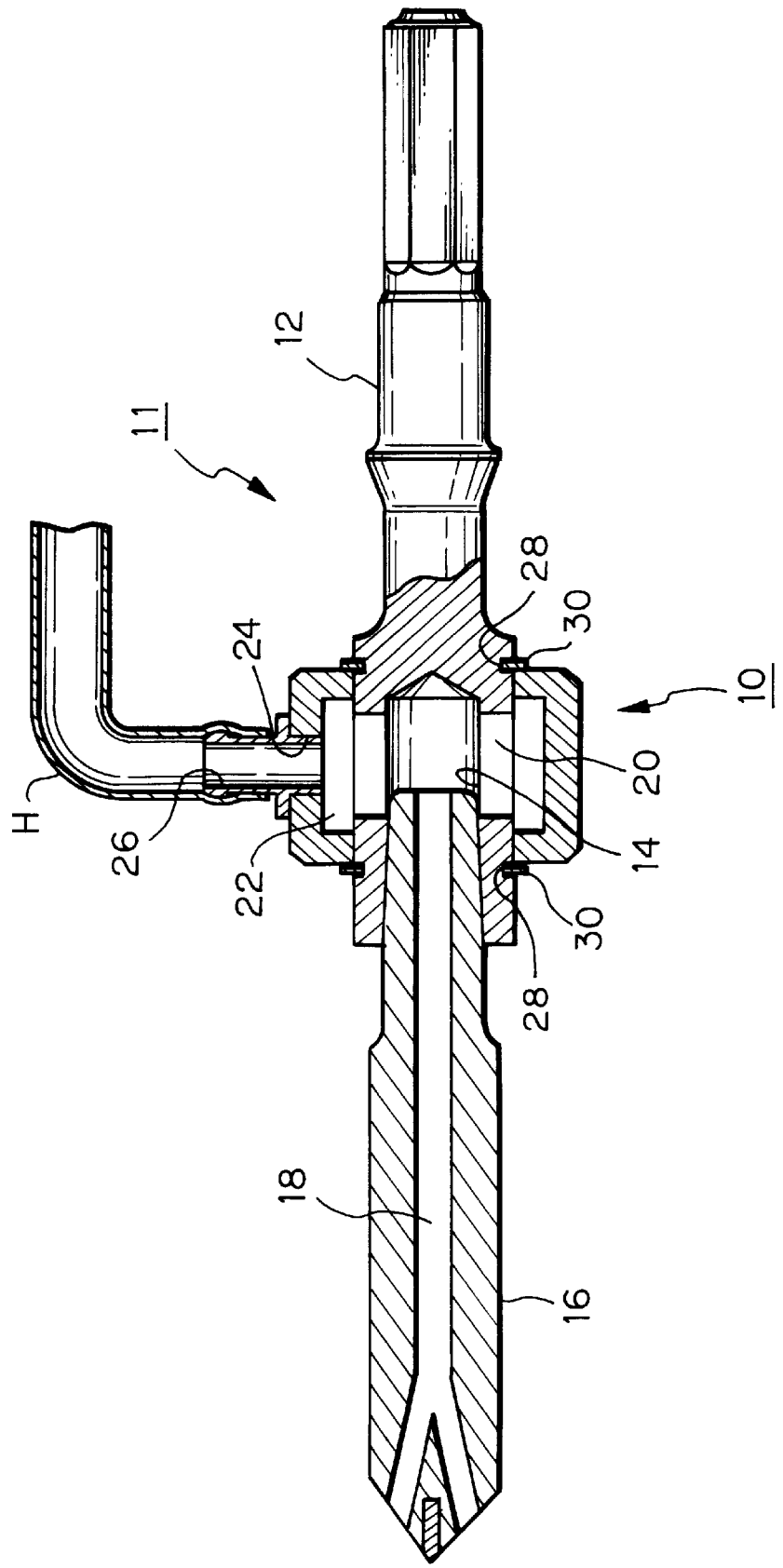
FIG. 1 is an elevation view of a two-piece drill, sectioned in part to show how a known adapter is used to connect the drill with a vacuum hose.

In the illustrated embodiments, the drill is of a one-piece structure. It is to be understood that the adapter may equally be mounted to a two-piece drill as in FIG. 1.

Although the present invention has been described with respect to its preferred embodiments, various modifications and changes may be made without departing from the scope of the invention as defined by the appended claims.

What is claimed is:

1. A vacuum adapter for connecting a drill with an external source of vacuum, said drill including a body having a proximal end and a distal end, and a shank having a first end connected to said proximal end of said body and a second end adapted to be connected to a drive mechanism, said body including an axial hole extending from distal end to said first end of said shank, and said shank including at least one radial hole communicated with said axial hole, said shank having an outer peripheral surface, said vacuum adapter being relatively rotatably mounted on said outer peripheral surface of said shank, said vacuum adapter comprising:

a generally cylindrical hollow body adapted to be fitted around said outer peripheral surface of said shank and including a radial through port having one end adapted to be fluidly communicated with said at least one radial hole of said shank and the other end adapted to be fluidly communicated with an external source of vacuum, said generally cylindrical hollow body having an inner surface and an outer surface, said hollow body having an engagement portion, said shank having a corresponding engagement portion in said outer peripheral surface thereof, said engagement portion of said hollow body being lockingly engaged with said engagement portion of said shank so as to prevent axial displacement of said vacuum adapter relative to said drill, said engagement portion of said hollow body being capable of radial displacement so as to be movable between an engaged position where said engagement portion of said hollow body is lockingly engaged with said engagement portion of said shank and a disengaged position where said engagement portion of said hollow body is disengaged from said engagement portion of said shank to permit removal of said vacuum adapter from said drill.

2. The vacuum adapter of claim 1, wherein said engagement portion of said shank has a slanted surface, whereby said engagement portion of said hollow body is subjected to a radial outward force when a predetermined axial force is applied to said vacuum adapter in such a manner that said engagement portion of said hollow body is urged against said slanted surface of said engagement portion of said shank.

3. The vacuum adapter of claim 1, wherein said engagement portion of said hollow body is in the form of a projection, and said engagement portion of said shank is in the form of a recess.

4. The vacuum adapter of claim 3, wherein said engagement portion of said hollow body is an annular projection.

5. The vacuum adapter of claim 4, wherein said engagement portion of said hollow body includes at least one axial slit.

6. The vacuum adapter of claim 1, wherein said engagement portion of said hollow body is in the form of a recess, and said engagement portion of said shank is in the form of a projection.

7. The vacuum adapter of claim 1, wherein said hollow body has an annular groove in said inner surface thereof, said annular groove being communicated with said at least one radial hole of said shank and fluidly communicated with said radial through port.

8. The vacuum adapter of claim 1, wherein said hollow body is made of a plastic material which has a low frictional resistance and is elastic.

9. The vacuum adapter of claim 1, further comprising a retaining member engaged around said engagement portion of said hollow body to hold said engagement portion of said hollow body in said engaged position, and said retaining member being disengaged from said engagement portion of said hollow body when said engagement portion of said hollow body is moved from said engaged position to said disengaged position.

10. The vacuum adapter of claim 9, wherein said retaining member is capable of axial displacement on said hollow body.

11. The vacuum adapter of claim 10, wherein said retaining member is in the form of a ring and has an internally threaded inner surface, and said engagement portion of said hollow body has an externally threaded outer surface, said internally threaded inner surface of said retaining member being threadingly engaged with said externally threaded surface of said engagement portion of said hollow body so as to hold said engagement portion of said hollow body in said engaged position.

12. The vacuum adapter of claim 1, wherein said hollow body has an axis, further comprising a retaining member capable of rotation about said axis of said hollow body, said retaining member being rotated to thereby cause said engagement portion of said hollow body to be moved between said engaged position and said disengaged position.

13. The vacuum adapter of claim 1, further comprising a retaining member including a ring and a compression spring, wherein said hollow body has an end flange, and said retaining member is forced against said end flange of said hollow body by said compression spring so as to hold said engagement portion of said hollow body in said engaged position.

14. The vacuum adapter of claim 1, further comprising an annular retaining member rotatably mounted around said engagement portion of said hollow body and including at least one relatively small opening and at least one relatively large opening, and a ball disposed between said retaining member and said engagement portion of said hollow body and selectively engaged with said at least one relatively small opening and said at least one large opening, whereby said engagement portion of said hollow body is held in the engaged position when said ball is received in said at least one small opening and is allowed to move to the disengaged position when said ball is received in said at least one large opening.

15. A drilling apparatus comprising:

an elongated drill including a drill body having a proximal end and a distal end, and a shank having one end connected to said proximal end of said drill body and the other end adapted for connection to a drive mechanism, said drill body including an axial through hole extending from distal end to said one end of said shank, said shank including at least one radial hole communicated with said through hole of said drill body and having an outer peripheral surface; and a vacuum adapter including a substantially cylindrical hollow body hermetically placed around said outer peripheral surface of said shank, said hollow body including a radial through port having one end communicated with said at least one radial hole of said shank and the other end adapted for fluid communication with an external source of vacuum, said hollow body having an inner surface and an outer surface, said drill being rotatable relative to said vacuum adapter by said drive mechanism, said hollow body having an engagement portion, and said shank having a corresponding engagement portion in said outer peripheral surface thereof, said engagement portion of said hollow body being engaged with said engagement portion of said shank so as to prevent axial displacement of said vacuum adapter relative to said drill, said engagement portion of said hollow body being capable of radial displacement so as to be movable between an engaged position where said engagement portion of said hollow body is lockingly engaged with said engagement portion of said shank and a disengaged position where said engagement portion of said hollow body is disengaged from said engagement portion of said shank to permit removal of said vacuum adapter from said drill.

16. The drilling apparatus of claim 15, further comprising a retaining member engaged around said engagement portion of said hollow body to hold said engagement portion of said hollow body in said engaged position, wherein said retaining member is disengaged from said engagement portion of said hollow body to permit said engagement portion of said hollow body to be moved from said engaged position to said disengaged position.

17. The drilling apparatus of claim 15, further comprising a retaining member in the form of a ring, said retaining member having an internally threaded inner surface, and said engagement portion of said hollow body has an externally threaded outer surface, said internally threaded inner surface of said retaining member being threadingly engaged with said externally threaded surface of said engagement portion of said hollow body so as to hold said engagement portion of said hollow body in said engaged position.

18. The drilling apparatus of claim 15, wherein said body has an axis, said drill apparatus further comprising a retaining member capable of rotation about said axis of said hollow body, said retaining member being rotatably to thereby cause said engagement portion of said hollow body to be moved between said engaged position and said disengaged position.

19. The drilling apparatus of claim 15, further comprising a retaining member in the form of a ring and a compression spring, said hollow body including an end flange, said retaining member being forced against said end flange of said hollow body by said compression spring so as to hold said engagement portion of said hollow body in said engaged position.

20. The drilling apparatus of claim 15, further comprising an annular retaining member rotatably mounted around said engagement portion of said hollow body and including at least one relatively small opening and at least one relatively large opening, and a ball disposed between said engagement portion of said hollow body and said annular retaining member and said ball being selectively engaged with said at least one relatively small opening and said at least one large opening.

21. The drilling apparatus of claim 20, further comprising a plurality of relatively small openings and a plurality of relatively large openings, said plurality of relatively small openings and said plurality of relatively large openings being arranged in an alternate manner.

22. The drilling apparatus of claim 15, wherein said engagement portion of said shank has a slanted surface, such that said engagement portion of said hollow body is subjected to a radial outward force when a predetermined axial force is applied to said vacuum adapter in such a manner that said engagement portion of said hollow body is urged against said slanted surface of said engagement portion of said shank.

* * * * *